Oct. 16, 1934.  V. J. EVANS ET AL  1,976,930
ROOM THERMOSTAT
Filed Jan. 2, 1930

INVENTORS
Vincent J. Evans
and Leger A. Castonguay
by Edmund J. Le Pas
ATTORNEY

Patented Oct. 16, 1934

1,976,930

UNITED STATES PATENT OFFICE 1,976,930

ROOM THERMOSTAT

Vincent J. Evans, Lakewood, and Leger S. Castonguay, Cuyahoga Falls, Ohio, assignors to The Patrol Valve Company, Cleveland, Ohio, a corporation of Ohio Application January 2, 1930, Serial No. 417,913

16 Claims. (Cl. 236—101)

This invention relates to thermostatic devices and in particular thermostatic regulators adapted to respond to atmospheric temperature changes of the surrounding space commonly referred to as room thermostats.

One of the objects of this invention is to provide a generally simplified thermostat of the type disclosed, having a relatively small number of parts which are inexpensive to manufacture and so arranged that the assembly of these parts may be readily accomplished with relatively inexpensive labor.

A further object of this invention is to provide a room thermostat in which all of the operating parts of the thermostat are adapted to be assembled as a complete unit separate from the casing of the thermostat, said unit including a generally simplified valve structure and a thermostatic actuator adapted to be manually adjusted to vary the operation of the device.

Stated in general terms our invention consists in the provision of a small inexpensive thermostatic valve provided with an adjustable thermostatic actuator which may be set to open and close the valve at various pre-determined temperatures.

With these and other objects in view, the invention consists in the novel construction, arrangement and combination of parts, hereinafter described, illustrated in some of its embodiments in the accompanying drawing and particularly pointed out in the appended claims.

Figure 1:
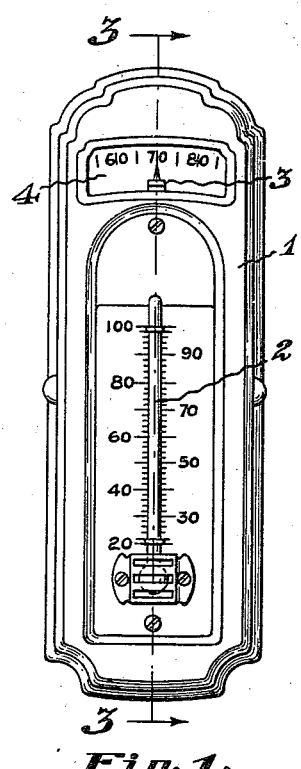
Figure 2:
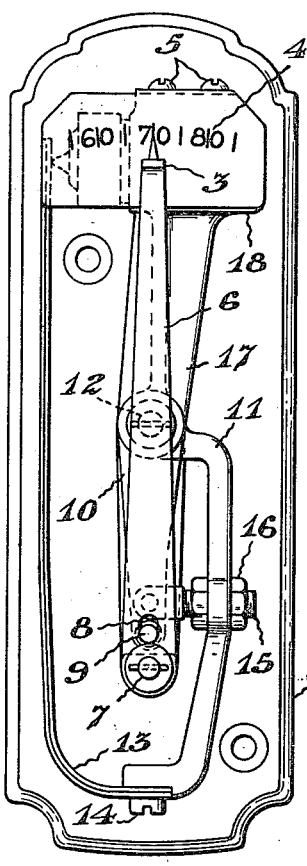
Figure 3:
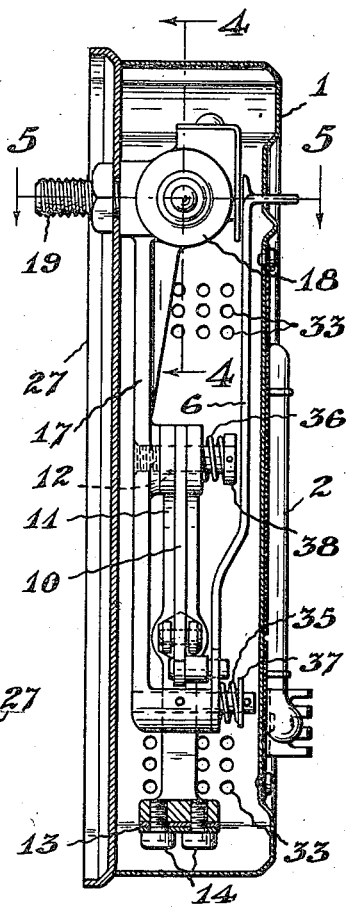
Figure 4:
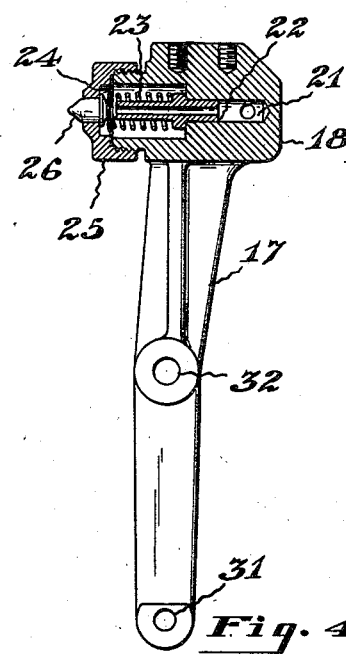
Figure 5:
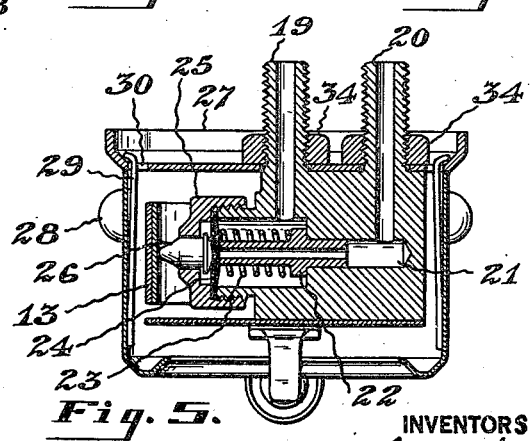

In the drawing: Figure 1 is a front elevational view of our improved thermostat. Figure 2 is an enlarged view similar to Figure 1, with the thermostat cover removed. Figure 3 is a side elevational view partly in section of the thermostat. Figure 4 is a sectional view taken on line 4—4 of Figure 3, showing the arrangement of the valve parts, and Figure 5 is a sectional view taken on line 5—5 of Figure 3.

Our improved thermostat is provided with a suitable cover 1, having a thermometer 2 fixed to the front thereof and an adjusting lever 3 accessible from the exterior of the thermostat for the purpose of adjusting the same so as to operate at various predetermined temperatures. The indicating or adjusting lever 3 is positioned in front of an indicating scale 4 which is secured to the device in any suitable manner such as by means of the screws 5.

The adjusting lever 3 forms a part of the lever 6 which is pivotally connected to the bracket 17 by means of the stud 7 carried therein. The lever 6 is further provided with a slot 8 for the reception of a pin 9 which is carried by the lever 10. The lever 10 is pivotally carried by the bracket 17 by means of the stud 12 which further provides a pivotal support for the arm 11, the opposite end of which carries a thermostatic strip 13 secured thereto in any suitable manner such as by screws 14. The lever 10 and arm 11 are adjustably connected to each other by means of the threaded yoke 15 which is provided with lock nuts 16.

With the arrangement shown, a considerable movement of the upper end of the lever 6 will adjust the position of the upper end of the thermostatic element 13 a small amount in order to vary the temperature at which this element operates the valve. The upper end of the bracket 17 is formed so as to provide a valve casing 18 having outlet and inlet passageways 19 and 20 respectively which connect with the communicating passageway 21. The passageway 21 is adapted to receive an elongated and removable cylindrical valve seat 22 upon which is carried a spring 23. The spring 23 is adapted to engage a flexible diaphragm 24 which is secured to the open end of the valve casing 18 in sealing relation therewith by means of the apertured nut 25. A pin 26 having a spherical head formed on one end thereof is carried in the aperture of the nut 25.

The pin 26 acts as a valve head and valve stem and is adapted to be engaged by the thermostatic strip 13 in effecting the operation of the valve by forcing the pin head against the diaphragm 24 which in turn is pressed over the opening of the valve seat 22 closing the same. Upon a pre-determined change in temperature the thermostatic strip 13 is withdrawn from engagement with the pin 26 and the flexible diaphragm 24 is moved away from the valve seat 22 by spring 23 and in this way the valve is opened. By moving the adjustment indicator 3 to the positions indicated on the scale it is possible to cause the thermostatic strip 13 to open and close the valve at the various indicated temperatures. In general these valves have been found to open and close the valve with a temperature variation of from 1 to 2° F. which is amply sufficient sensitivity for most purposes.

The thermostatic strip 13 in the present instance is formed from a laminated metal sheet one side of which has a higher coefficient of thermal expansion than the other. The strip 13 is secured in place with its high expansion side to the left so that an increase in the temperature of the strip will cause it to warp to the right. Where it is desired to operate the valve in a reverse manner, the strip 13 would be formed so that its low expansion side would be to the left and an increase in its temperature would cause it to warp to the left instead of the right as explained above.

The thermostat case 1 is provided with a plurality of openings 33 in order to permit air circulation through the case in order to quickly effect the operation of the thermostatic element 13 upon atmospheric temperature changes. The valve body extension 17 is provided with threaded holes 31 and 32 for the reception of the studs 7 and 12. The cover 1 is secured to the back 27 of the thermostat by means of the spring clips 29 which are received in the openings 30 and which may be released upon pressing the knobs 28 carried thereby. In this manner the cover 1 may be removed from the thermostat back exposing all of the elements of the thermostat to view. The operative parts of the thermostat are carried upon the thermostat back 27 by means of the threaded conduits 19 and 20 which are secured in place to the back of the case by means of the nuts 34. The lever 6 and the lever 10 and arm 11 are held in place on the studs 7 and 12 by means of the springs 35 and 36 and their retaining washers 37 and 38.

The manufacture of this device is considerably simplified by reason of the fact that all of the operating elements of the valve may be assembled and adjusted as a unit separate from the thermostat cover 1 and its back 27. In assembling the device the yoke 15 is adjusted in the arm 11 so that the thermostatic strip 13 engages the valve stem 26 and just closes the valve when the indicator 2 is set at the position on the scale 4 corresponding to the temperature of the room in which this operation is taking place.

While the thermostat herein disclosed is particularly adapted to the control of gas burning appliances using a diaphragm valve or a pilot light controlled thermostatic valve it is apparent that it is susceptible to various other uses requiring a highly sensitive thermostatic valve responsive to atmospheric temperature conditions.

Furthermore, it is to be understood that the particular forms of apparatus shown and described, and the particular procedure set forth, are presented for purposes of explanation and illustration and that various modifications of said apparatus and procedure can be made without departing from our invention as defined in the appended claims.

Having thus described our invention, what we claim is:

1. In a thermostatic valve, valve mechanism comprising a body with a side opening and inlet and outlet passageways having a communicating passageway therebetween, a removable valve seat adapted for reception in said communicating passageway, a flexible diaphragm, an apertured nut for clamping said diaphragm in sealing relation over said side opening, a pin slidably carried in the aperture of said nut to engage said diaphragm to cause it to cover said valve seat, and thermostatic means for effecting the operation of said pin.

2. In a thermostatic valve, valve mechanism comprising a body with a side opening and inlet and outlet passageways having a communicating passageway therebetween, a removable valve seat adapted for reception in said communicating passageway, a flexible diaphragm, a spring carried on said valve seat engaging said diaphragm to urge it away from said valve seat, an apertured nut for clamping said diaphragm in sealing relation over said side opening, a pin slideably carried in the aperture of said nut to engage said diaphragm to cause it to cover said valve seat, and thermostatic means for effecting the operation of said pin.

3. In a thermostatic valve, valve mechanism comprising a body with inlet and outlet openings and a communicating passageway therebetween, a removable valve seat positioned in said passageway, a flexible diaphragm secured in sealing relation over an opening formed in said body adjacent to said valve seat, spring means to urge said diaphragm away from said valve seat, and thermostatic means to press said diaphragm into engagement with said seat to effect the closing of said valve.

4. In a thermostatic valve, in combination, a valve body having communicating inlet and outlet openings and a valve port located therebetween, means cooperating with the port of said valve body for controlling fluid flow therethrough, a thermostatic actuator for said means, an arm extending alongside of said thermostatic actuator and joined at one end to an end of said actuator, a pivotal mounting for the other end of said arm, and a fulcrum lever operatively associated with said arm for adjusting the position of said thermostatic actuator.

5. In a thermostatic valve, in combination, a valve body having communicating inlet and outlet openings and a valve port located therebetween, means cooperating with the port of said valve body for controlling fluid flow therethrough, a thermostatic actuator for said means, an arm extending alongside of said thermostatic actuator and joined at one end to an end of said actuator, a pivotal mounting for the other end of said arm, a fulcrum lever for adjusting the position of said thermostatic actuator, and means for connecting the intermediate portion of said arm to said fulcrum lever.

6. In a thermostatic valve, in combination, a valve body having communicating inlet and outlet openings and a valve port located therebetween, means cooperating with the port of said valve body for controlling fluid flow therethrough, a thermostatic actuator bar for said means, an arm extending alongside of said thermostatic actuator bar and joined at one end to an end of said actuator bar, a pivotal mounting for the other end of said arm, a fulcrum lever for adjusting the position of said actuator bar, and means for connecting said arm to the fulcrum point of said lever.

7. In a thermostatic valve, in combination, a cast metal valve body having an elongated supporting member integrally formed therewith, a valve member extending from the valve body, a thermostatic actuator bar for said valve member adjustably carried by the supporting member of said body at a point intermediate the ends of the supporting member, an adjustment lever for said actuator pivotally mounted at one of its ends on the supporting member, and means for connecting said thermostatic actuator bar to said lever at a point adjacent the pivotal mounting of said lever.

8. In a thermostatic valve, valve mechanism comprising a body with a side opening and inlet and outlet openings having a communicating passageway therebetween, a valve seat located in the communicating passageway of said body, a flexible diaphragm, an apertured nut for clamping said diaphragm in sealing relation over the side opening of said body, a pin slideably carried in the aperture of said nut to engage said diaphragm to cause it to cover said valve seat, and thermostatic means for effecting the operation of said pin.

9. In a thermostatic valve, valve mechanism comprising a body with a side opening and inlet and outlet openings having a communicating passageway therebetween, a valve seat located in the communicating passageway of said body, a flexible diaphragm, an apertured nut for clamping said diaphragm in sealing relation over the side opening of said body, a spring carried on said valve seat engaging said diaphragm to urge it away from said valve seat, a pin slideably carried in the aperture of said nut to engage said diaphragm to cause it to cover said valve seat, and thermostatic means for effecting the operation of said pin.

10. In a device of the kind described, a valve, an actuator for said valve, an arm extending alongside of said actuator and joined at one end to an end of said actuator, a pivotal mounting for the other end of said arm and a fulcrum lever associated with said arm for adjusting the position of said actuator.

11. In a device of the kind described, a valve, an actuator for said valve, an arm extending alongside of said actuator and joined at one end to an end of said actuator, a pivotal mounting for the other end of said arm and a fulcrum lever associated with said arm for adjusting the position of said actuator, and means for connecting the intermediate portion of said arm to said fulcrum lever.

12. In a device of the kind described, a valve, an actuator for said valve, an arm extending alongside of said actuator and joined at one end to an end of said actuator, a pivotal mounting for the other end of said arm and a fulcrum lever associated with said arm for adjusting the position of said actuator, and means for adjustably connecting the arm to said lever.

13. In a device of the kind described, a base, a valve at one end thereof, a control element to actuate said valve and extending from the valve end toward the other end of the base, an arm attached at one of its ends to said valve member and pivoted to the base at a point intermediate the ends thereof, and an adjustment lever pivoted to the base and connected to said arm at a point intermediate its pivot and its connection to the control element.

14. In a device of the kind described, a base, a valve at one end thereof, a control member to actuate said valve and extending from said valve toward the other end of the base, an arm connected at one of its ends to said control member to move same, and pivoted to the base at a point intermediate the ends thereof, a scale of adjustments adjacent the valve, a lever traversing said scale, extending toward the other end of the base, and pivoted thereto, and fulcrum means between said arm and said lever whereby adjustment of said lever moves the arm and consequently regulates said control member.

15. In a device of the kind described, a base, a valve at one end thereof, a control member to actuate said valve and extending from said valve toward the other end of the base, an arm connected at one of its ends to said control member to move same, and pivoted to the base at a point intermediate the ends thereof, a scale of adjustments adjacent the valve, a lever traversing said scale, extending toward the other end of the base, and pivoted thereto, and fulcrum means between said arm and said lever whereby adjustment of said lever moves the arm and consequently regulates said control member, and means to adjust the fulcrum means between said levers.

16. In a device of the kind described, a base, valve means at one end thereof, a control member for actuating said valve and extending toward the other end of the base, an arm secured to the control element at a point remote from the valve, an adjusting lever pivoted to the base, and means forming a fulcrum between said arm and said lever, said means including a second lever pivoted to the base intermediate the ends thereof and having a connection with said arm and a connection with said first lever, whereby adjustment of said first lever will move, by the following order, said second lever, said arm, and said control element.

VINCENT J. EVANS.
LEGER S. CASTONGUAY.